United States Patent [19]
Clark

[11] Patent Number: 6,137,026
[45] Date of Patent: *Oct. 24, 2000

[54] ZEROS BIO-DYNAMICS A ZERO-EMISSION NON-THERMAL PROCESS FOR CLEANING HYDROCARBON FROM SOILS ZEROS BIO-DYNAMICS

[76] Inventor: Steve L. Clark, 1730 Hillcrest, Baytown, Tex. 77520

[ * ] Notice: This patent issued on a continued prosecution application filed under 37 CFR 1.53(d), and is subject to the twenty year patent term provisions of 35 U.S.C. 154(a)(2).

[21] Appl. No.: 08/864,597

[22] Filed: May 28, 1997

[51] Int. Cl.[7] .................................................... A62D 3/00

[52] U.S. Cl. ...................... 588/205; 588/206; 588/207; 588/208; 588/209; 588/213; 588/223

[58] Field of Search .................................... 405/128, 129, 405/263; 588/206, 207, 209, 223, 205, 208, 213

[56] References Cited

U.S. PATENT DOCUMENTS

| | | | |
|---|---|---|---|
| 2,102,427 | 12/1937 | Lloyd | 110/8 |
| 2,143,283 | 1/1939 | Schmidt . | |
| 3,001,373 | 9/1961 | Du Bois Eastman et al. . | |
| 3,403,643 | 10/1968 | Denig . | |
| 3,628,332 | 12/1971 | Kennar . | |
| 3,779,212 | 12/1973 | Wagner | 122/23 |
| 3,861,330 | 1/1975 | Santoleri | 110/7 |
| 3,861,332 | 1/1975 | Itasaka | 110/8 |
| 3,861,334 | 1/1975 | Stockman | 110/10 |
| 3,905,745 | 9/1975 | Konda . | |
| 4,344,486 | 8/1982 | Parrish | 166/272 |
| 4,434,028 | 2/1984 | Eppig et al. | 196/14.52 |
| 4,437,419 | 3/1984 | Hertel | 110/25.9 |
| 4,520,741 | 6/1985 | Carbeau et al. | 110/344 |
| 4,542,114 | 9/1985 | Hegarty . | |
| 4,620,492 | 11/1986 | Vogg | 110/345 |
| 4,656,972 | 4/1987 | Shimoda | 122/4 D |
| 4,762,074 | 8/1988 | Sorensen | 110/346 |
| 4,782,772 | 11/1988 | Chughtai | 110/345 |
| 4,827,854 | 5/1989 | Collette | 110/237 |
| 4,829,911 | 5/1989 | Nielson | 110/234 |
| 4,860,670 | 8/1989 | Jorgensen | 110/215 |
| 4,922,841 | 5/1990 | Kent | 110/346 |
| 5,016,599 | 5/1991 | Jubb . | |
| 5,035,188 | 7/1991 | Johnson | 110/345 |

(List continued on next page.)

FOREIGN PATENT DOCUMENTS 278282  8/1988  European Pat. Off. ............... 210/665

OTHER PUBLICATIONS

U.S. application No. 08/730,974, filed Oct. 1996, pending.

Olsen, J.C., "Unit Processes and Principles of Chemical Engineering", p 1–3, Jul. 1932.

Felder, R.M., "Elementary Principles of Chemical Processes", p 106, 1978.

EPA, Handbook on in-situ treatment of hazardous waste-contaminated soils, p 7–10, Jan. 1990.

*Primary Examiner*—Steven P. Griffin
*Assistant Examiner*—Eileen E. Nave
*Attorney, Agent, or Firm*—Akin, Gump, Strauss, Hauer & Feld, L.L.P.

[57] ABSTRACT

A combination of parallel processes is disclosed to provide optimal remediation operations for contaminated soil. Soils with high levels of heavy petroleum hydrocarbons are directed to a thermal process for destruction in a combustion process. Carbon dioxide generated and recovered in the thermal process is employed as a solvent in a solvent process to clean other soils of petroleum hydrocarbons and certain chlorinated hydrocarbon compounds. In the solvent process, contaminated soils are run through a closed soil separator where the soils are washed with carbon dioxide. The carbon dioxide is then dried from the soil and the soil is sent for segregation. Soils with the lightest forms of hydrocarbon contamination (gasoline, etc.) are subjected to a vaporization process utilizing heat energy generated in the thermal process to heat the soil, under a partial vacuum, and the vapors generated are captured, condensed, and recovered as product.

20 Claims, 4 Drawing Sheets

U.S. PATENT DOCUMENTS

| | | | |
|---|---|---|---|
| 5,050,508 | 9/1991 | Wilson | 110/235 |
| 5,129,331 | 7/1992 | Merritt et al. | 110/203 |
| 5,179,903 | 1/1993 | Abboud | 110/345 |
| 5,188,041 | 2/1993 | Noland et al. | 110/246 |
| 5,213,660 | 5/1993 | Hossain et al. | 162/5 |
| 5,222,446 | 6/1993 | Edwards et al. | 110/235 |
| 5,309,850 | 5/1994 | Downs | 110/235 |
| 5,339,755 | 8/1994 | Smith | 110/345 |
| 5,344,627 | 9/1994 | Fujii et al. | 423/220 |
| 5,402,739 | 4/1995 | Abboud et al. | 110/346 |
| 5,403,569 | 4/1995 | Abdelmalek | 423/242.7 |
| 5,450,801 | 9/1995 | Abboud | 110/203 |
| 5,452,763 | 9/1995 | Owen | 166/259 |
| 5,467,722 | 11/1995 | Meratla | 110/345 |
| 5,500,194 | 3/1996 | Bell | 423/239.1 |
| 5,518,621 | 5/1996 | Holcombe et al. | 210/634 |
| 5,645,730 | 7/1997 | Malachosky et al. | 210/665 |
| 5,648,053 | 7/1997 | Mimura et al. | 423/220 X |
| 5,655,319 | 8/1997 | Hirama et al. | 422/177 |
| 5,662,050 | 9/1997 | Angelo, II et al. | 110/246 |
| 5,709,077 | 1/1998 | Beichel | 60/39.55 |
| 5,711,770 | 1/1998 | Malina | 48/197 R |
| 5,724,805 | 3/1998 | Golomb et al. | 60/39.02 |
| 5,732,571 | 3/1998 | Maerz et al. | 62/611 |
| 5,906,806 | 5/1999 | Clark | 423/437.1 |

6,137,026

ZEROS BIO-DYNAMICS A ZERO-EMISSION NON-THERMAL PROCESS FOR CLEANING HYDROCARBON FROM SOILS ZEROS BIO-DYNAMICS

SPECIFICATION

BACKGROUND OF THE INVENTION

1. Field of the Invention

The present invention relates to a process for decontaminating soil and waste materials. More particularly, the present invention relates to a combination of processes including a thermal combustion process, a solvent wash process that utilizes carbon dioxide generated in the thermal process, and a vaporization process that utilizes heat energy generated in the thermal process, which in combination are used to remove volatile organic compounds from soil and other waste which have various levels of contamination.

2. Description of the Related Art

For many years a major problem occurring with the development of industry, in general, and the energy and petrochemical industry, in particular, has been the need to remove the oils and other hydrocarbons that have been spilled from the contaminated soil. The processes of choice have always been traditional thermal combustion processes, but the cost of these processes and the collateral damage that they can cause to the environment makes this solution unattractive in many cases. Most soil contamination is reported to be less than one percent (1%) by volume. The thermal processing of this material which contains very little hydrocarbon contamination is expensive at the very least, and most frequently causes damage to the soil. Further, the effects of the airborne contaminates and the use of ambient air in the thermal process can result in damage to a wide area.

Other treatment processes for contaminated soils lack the ability to clean or remediate the contamination. Burying soils in vaults has not been a viable or cost effective solution and the excavation and transportation of contaminated soil leaves the high possibility of scattering the pollution. The use of microorganisms or "microbes" has little value since much of the contamination either kills the organisms or they have little effect on the pollutant. Additionally, few people desire or will accept a sludge pit in their neighborhood.

With an increasing worldwide population and an increased per capita demand for energy, concern is now being raised over the environmental pollution resulting from the emission of gaseous byproducts from combustion processes. Even carbon dioxide, a gaseous compound produced during combustion by oxidation of carbon and which is essential to plant life is being viewed as a pollutant. Carbon dioxide has been identified as one of many "greenhouse" gases and its increased level in the earth's atmosphere is thought likely to contribute to an undesirable global warming effect.

A thermal process is taught by Wagner in U.S. Pat. No. 3,779,212 that a pure hydrocarbon fuel oxidized with pure oxygen produces carbon dioxide, water, and carbonic acid as products of combustion. Wagner further teaches that the carbonic acid rapidly disassociates into carbon dioxide and water resulting in only carbon dioxide and water as the ultimate products of the process. Wagner additionally teaches that the flame temperature associated with the combustion of pure methane with pure oxygen can reach 6,000 degrees Fahrenheit, (3,315.56 degrees Celsius). Wagner's invention is a specialized boiler designed to maximize thermal efficiency with very small size and low weight per unit of energy derived. For refractory lined combustion chambers and standard energy recovery boiler systems, lower combustion gas temperatures are required. Typical refractory limitations on continuous operating temperature are in the area of 2,500 degrees Fahrenheit (1371.1 degrees Celsius).

Additional background information can be found in U.S. Pat. Nos. 2,102,427 to Lloyd; 3,779,212 to Wagner; 5,309,850 to Downs; 5,179,903 to Abboud; 5,035,188 to Johnson; 4,860,670 to Jorgensen; 4,827,854 to Collette; 4,782,772 to Chughtai; 4,762,074 to Sorensen; 4,656,972 to Shimoda and 4,620,492 to Vogg. Additionally, Applicant's co-pending application Ser. No. 08/730,974 filed Oct. 16, 1996, now U.S. Pat. No. 5,906,816 provides additional background material.

It would be desirable to have a process that addresses and resolves most if not all of these concerns and interacts proactively to provide an acceptable, non-polluting, cost effective solution to this major social and environmental problem.

SUMMARY OF THE INVENTION

The present invention is a combination of parallel processes that provide optimal remediation operations for contaminated soil. Soils with high levels of heavy petroleum hydrocarbons are directed to a thermal process for destruction in a combustion process. Carbon dioxide generated and recovered in the thermal process is employed as a solvent in a solvent process to clean soils having moderate contamination with petroleum hydrocarbons and chlorinated hydrocarbon compounds. In this solvent process, contaminated soils are run through a closed soil separator where the soils are washed with carbon dioxide. The carbon dioxide is then dried from the soil and the soil is sent for segregation. Additionally, as an option, soils with the lightest forms of hydrocarbon contamination, such as gasoline, etc., are subjected to a vaporization process utilizing heat energy generated from the thermal process to heat the soil under a partial vacuum. The vapors generated are captured, condensed, and recovered as product.

BRIEF DESCRIPTION OF THE DRAWINGS

A better understanding of the present invention can be obtained when the detailed description set forth below is reviewed in conjunction with the accompanying drawings, in which.

DETAILED DESCRIPTION OF INVENTION

Figure 1:
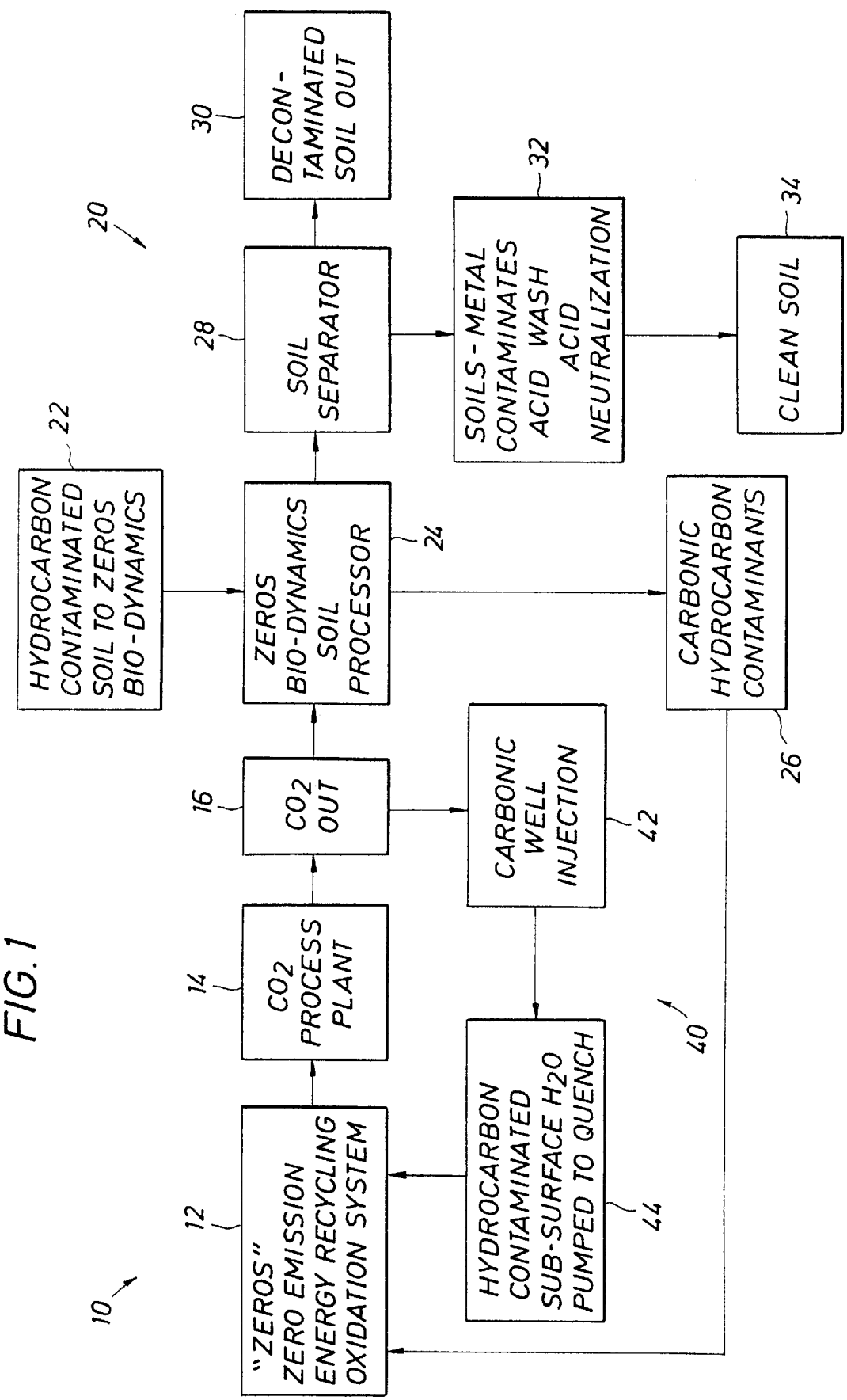
FIG. 1 is a block flow diagram of the process of the present invention.

As shown in FIG. 1, the process of the present invention combines a thermal process 10 that includes a combustion step 12 with carbon dioxide recovery 14, with a solvent process 20 for removing hydrocarbons from contaminated soils utilizing carbon dioxide from the thermal process 10 as a solvent. The thermal process 10 includes a combustion step 12 that utilizes oxygen rather than air for oxidation and which utilizes a recycle to increase the combustion efficiency. The carbon dioxide generated in the combustion step is recovered in a carbon dioxide processing step 14. The recovered carbon dioxide is then forwarded in a carbon dioxide distribution step 16 to the solvent process 20.

Thermal process 10 is referred to in the figures generally as the ZEROS process. Solvent process 20 is referred to in the figures generally as Bio-dynamics.

The solvent process 20 begins with a step 22 of introducing contaminated soil or other waste material and carbon dioxide from the distribution step 16 into a soil processor. Soil processing step 24 uses carbon dioxide as a solvent to extract hydrocarbons and other contaminants such as chlorinated compounds. The carbon dioxide containing the extracted hydrocarbon and other contaminants is separated from the soil. The contaminated carbon dioxide can then be returned to the thermal process 10 for combustion of the hydrocarbons and recovery of the carbon dioxide.

After separation of the carbon dioxide, the soil is then subjected to a segregation step 28 in which soils containing metal contaminants are separated for further treatment. The remaining decontaminated soils are removed from the solvent process 20 in a removal step 30 for return to the original site of removal or to other locations for use as refill. Soil contaminated with metals can be treated in an acid wash and neutralization process 32 to remove the metals. The treated soil is then removed from the system in a removal step 34 for return to the original site or to other locations for use as refill.

An alternative process 40 that can also be used in conjunction with the thermal process involves cleaning contaminated soil in place. Carbon dioxide from the distribution step 16 is injected into the ground through a monitoring well in an injection step 42. The carbon dioxide acts as a solvent, picking up hydrocarbons, as it migrates through the earth and accumulating hydrocarbons in subsurface water. The hydrocarbon contaminated subsurface water and the carbon dioxide can then be pumped to the surface in a recovery step 44. The contaminated water and carbon dioxide can be treated in thermal process 10 to combust the hydrocarbons and recover the decontaminated water and carbon dioxide.

Figure 2A:
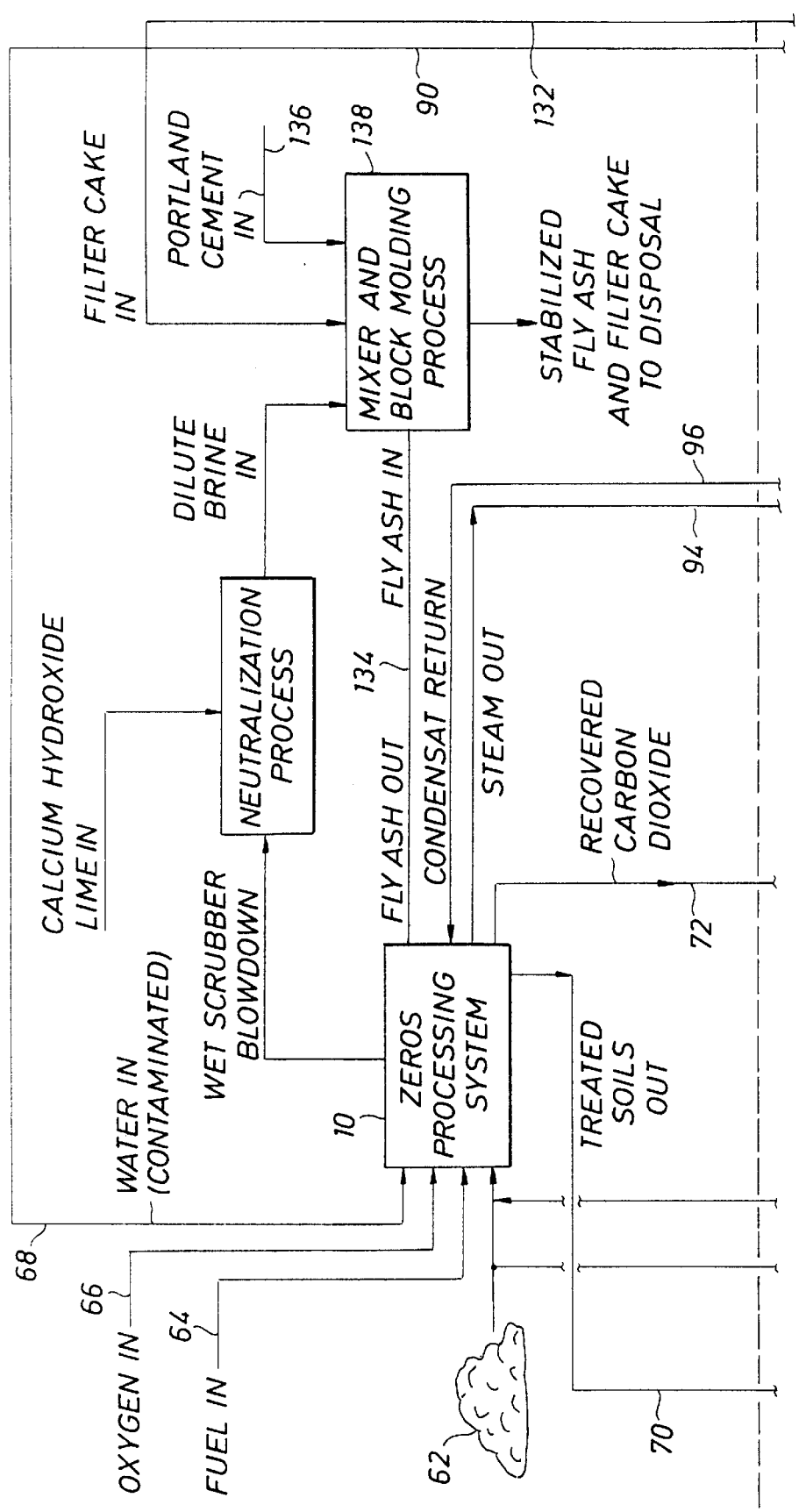
FIGS. 2A, 2B, and 2C is a detailed flow diagram of the process of the present invention.
Figure 2B:
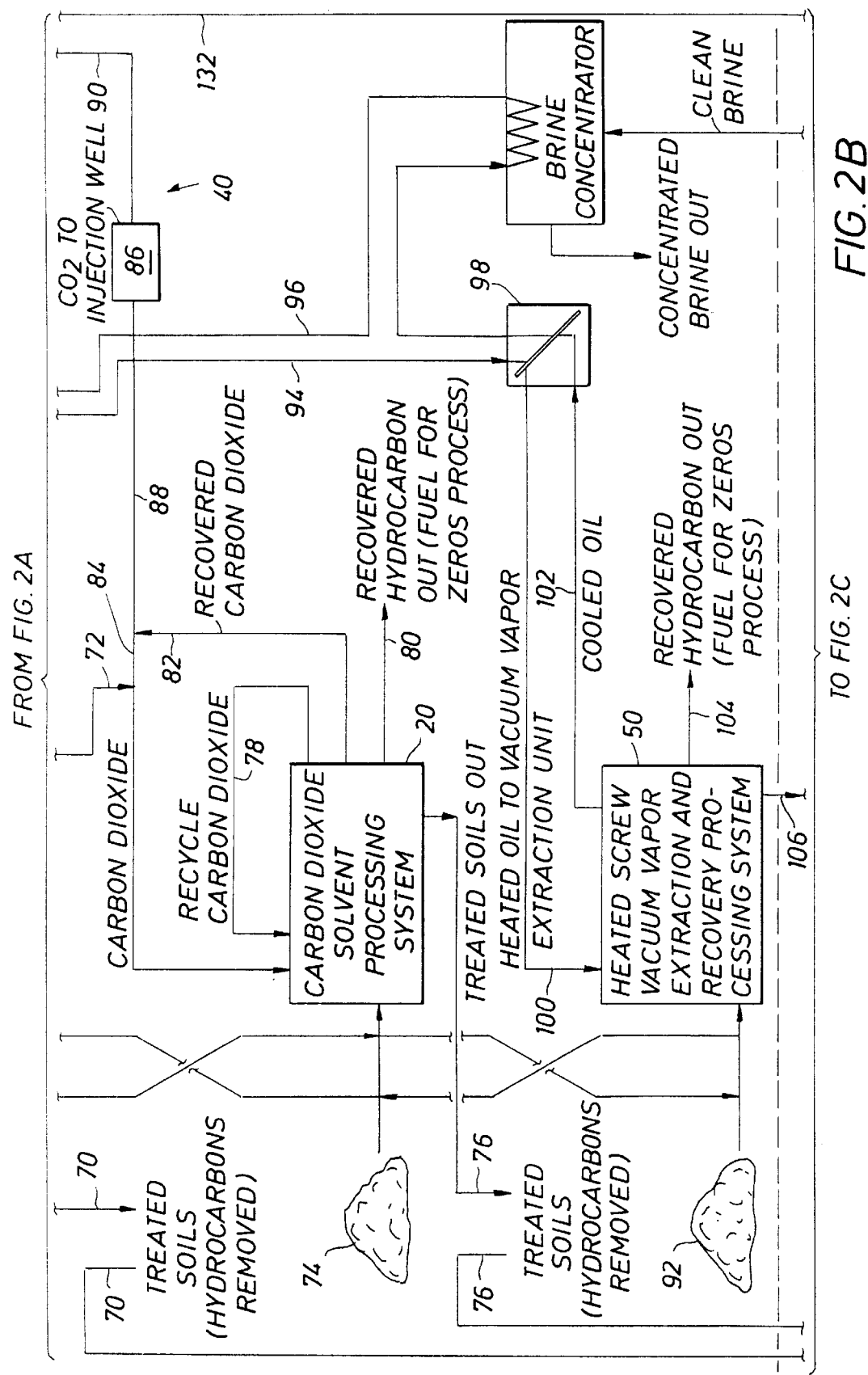
Figure 2C:
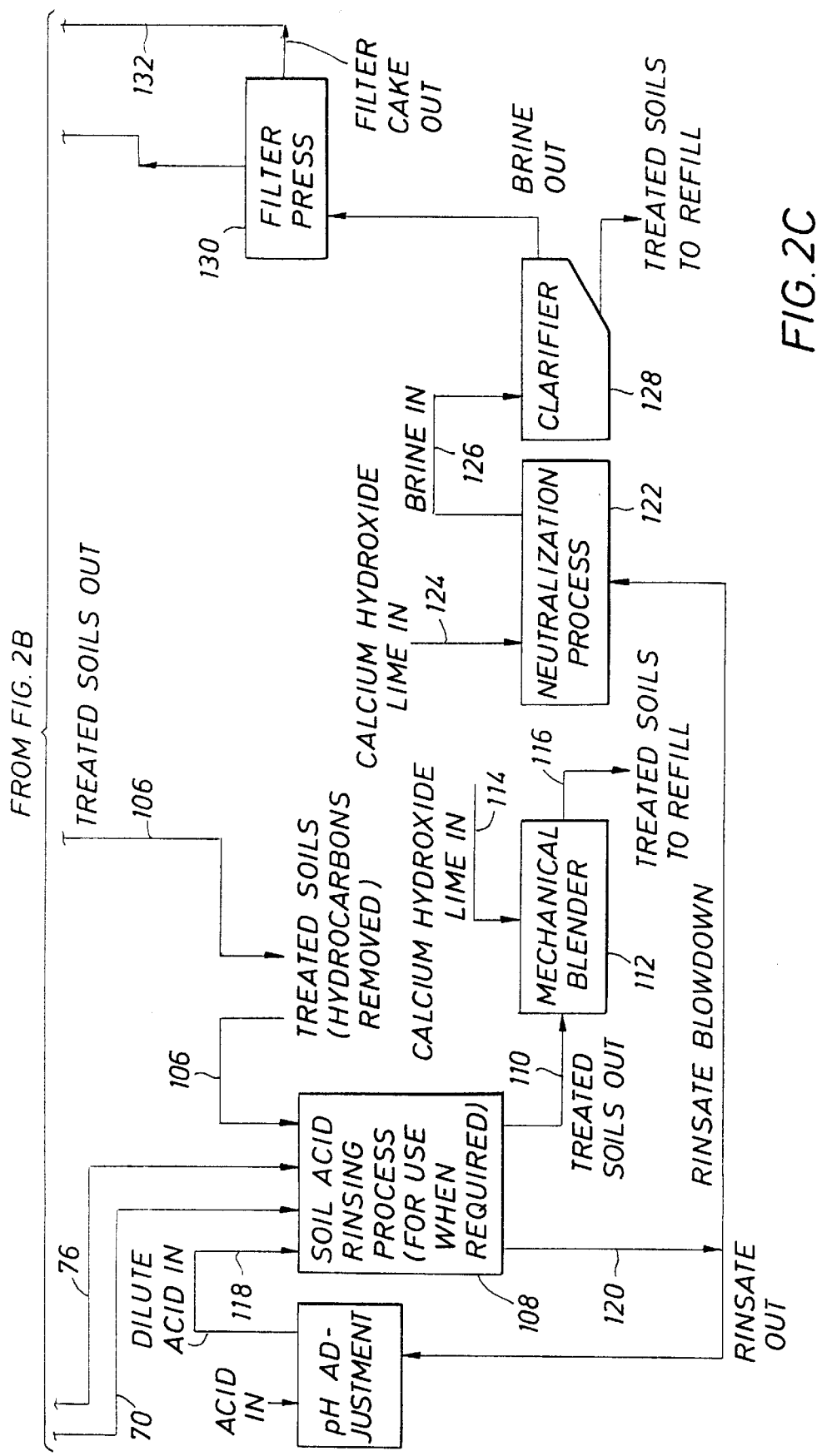

FIGS. 2A, 2B, and 2C depicts a more detailed flow sheet of the thermal process 10, the solvent process 20, and the vaporization process 50 of the present invention and the interaction between the processes when combined. This combination allows for the treatment of all types or levels of contamination and the general remediation of a contaminated area without any air or water pollution. The present invention allows for the complete destruction of contamination while producing an environmentally benign byproduct that aids and accelerates the remediation process.

Thermal process 10 of the present invention utilizes pure oxygen for combustion, but additionally utilizes a combination of water injection and combustion gas re-circulation to moderate and control the combustion gas temperature achieved in the combustion chamber. The utilization of oxygen for combustion, and water injection and re-circulated combustion gas for moderating combustion gas temperature, avoids the introduction of nitrogen into the combustion process. Nitrogen in a combustion process leads to the formation of pollution in the form of oxides of nitrogen ($NO_X$). Since air is composed of roughly 80% nitrogen by volume, the present invention by design avoids the employment of air as the source of oxygen for combustion or as a means of moderating the combustion gas temperature in the combustion chambers. Other reasons for avoiding the use of air in the present invention are the fact that a high volume of combustion gas would be produced per unit of fuel combusted and the resulting combustion gas would contain a lower percentage of carbon dioxide making carbon dioxide recovery less efficient.

Thermal process 10 begins by introducing soil 62, heavily contaminated by hydrocarbons, a fuel stream 64 or other hydrocarbon containing stream, an oxygen stream 66, and a water stream 68 into a combustion process. The thermal process 10 uses oxygen for combustion, combined with re-circulation of combustion gas and water injection to moderate combustion gas temperature, to avoid the necessity for introduction of nitrogen into the system. This allows for a more efficient combustion process generating greater combustion to carbon dioxide and decreasing the amount of emissions generated by the thermal process 10. A decontaminated soil stream 70 is removed from the thermal process 10 for replacement or refill.

The solvent process 20 of the present invention utilizes the purified carbon dioxide stream 72 from the thermal process 10 as a super-solvent to remove hydrocarbon and chlorinated hydrocarbon contamination from moderately contaminated soils 74. Use of the solvent process 20 allows treatment of moderately contaminated soil 74 without actual thermal treatment of the soil and without emissions. Contaminated soil 74 is introduced into a soil processor or separator where it is contacted with the carbon dioxide stream 72. Depending upon the level of hydrocarbon contamination, a carbon dioxide recycle stream 78 can be utilized to minimize the amount of carbon dioxide required for solvent process 20. The carbon dioxide is then removed from the soil and decontaminated soil stream 76 can be removed from the system and returned to the original site as clean soil or used as refill in other areas. The carbon dioxide containing the contaminates can be sent to thermal process 10 for further treatment. Additionally, the carbon dioxide and contaminants can be separated in the solvent process 20 and a contaminant stream 80 returned to the thermal process 10 while a recovered carbon dioxide stream 82 can be used in other processes.

One alternative process in which either recovered carbon dioxide stream 84 from thermal process 10 or recovered carbon dioxide stream 82 from solvent process 20 can be used involves cleaning soil in place. This alternative process utilizes carbonic fluids injection and recovery well techniques to recover hydrocarbon contamination that has leached from the soil into the subsurface water supply. Carbon dioxide stream 88 is introduced into a carbon dioxide injection monitoring well 86 where the carbon dioxide is released into a subsurface formation. The carbon dioxide picks up hydrocarbons from the formations and accumulates in subsurface water. Multiple adjacent wells can be used to recover a water and carbon dioxide stream 90 containing the hydrocarbon contamination. Stream 90 is pumped to the surface and treated in the thermal process 10 where the hydrocarbons are converted into carbon dioxide and water with no emissions while all contamination is neutralized and turned into commercial byproducts. Stream 90 can be utilized in thermal process 10 as quench water stream 68 to moderate combustion chamber temperature.

A vaporization process 50 can be used in conjunction with thermal process 10 and solvent process 20. In vaporization process 20, lightly contaminated soil 92 is subjected to a vaporization process utilizing heat energy generated from thermal process 10 to heat the soil and vaporize low boiling point hydrocarbons such as gasoline. Steam 94 generated in thermal process 10 can be used to heat oil or other heat transfer agents in heat exchanger 98. Heat transfer agent stream 100 can then be used to heat soil stream 92 in the vaporization process 50. Alternatively, steam 94 can be used directly to provide heat for the vaporization process 50. In either case, condensate stream 96 can be returned to thermal process 10. Vaporization process 50 can utilize a heat screw system in a partial vacuum environment or other similar techniques such as are known to those skilled in the art for heating and mixing soils or materials of similar consistencies. Vapor stream 104 generated in the vaporization process 50 can be captured, condensed, and used as fuel for thermal process 10. Decontaminated soil stream 106 can be removed from the system and returned to the original site as clean soil or used as refill in other areas.

Any of the decontaminated soil streams 70, 76, or 106 that may contain residual metals can be further processed to remove the metal contamination. These streams can be washed with a dilute acid solution 118 in a soil acid rinsing process 108 to leach out the residual metals until an acceptable level of contamination is reached. The acid washed soil stream 110 exiting the rinsing process 108 can be mixed with a calcium hydroxide lime stream 114 in a mechanical blender 112 to neutralize residual acid. Decontaminated soil stream 116 can be removed from the system and returned to the original site as clean soil or used as refill in other areas.

Rinsate stream 120 can also be neutralized using a lime stream 124 in a neutralization process 122. Hydroxides of the metals rinsed from the soils and dissolved into the acid rinsate stream 120 are formed when the rinsate 120 is treated by the addition of calcium hydroxide lime stream 124. These metal hydroxides can be removed from the neutralized rinsate stream 126 utilizing both a Lamella clarifier 128 and a filter press 130. The spent filter cake stream 132 containing the metal hydroxides can then be mixed with the fly ash stream 134 from the thermal process 10 and/or a Portland cement stream 136 in a mixer and block molding process 138 for stabilization and disposal.

As will now be recognized, the present invention includes a combination of processes to remove hydrocarbon and other contaminants from soil. Preferably, heavily contaminated soils will be treated in thermal process 10. Soils with medium contamination will be treated in solvent process 20 utilizing carbon dioxide generated in thermal process 10 as the solvent. Lightly contaminated soils can be treated in vaporization process 50 utilizing heat energy from thermal process 10 to vaporize contaminants. Additionally, excess carbon dioxide from the thermal process 10 can be injected into monitoring wells to clean hydrocarbons from contaminated subsurface formations and water.

The foregoing disclosure and description of the invention are illustrative and explanatory thereof, and various changes in the details of the illustrated apparatus and construction and method of operation may be made without departing from the spirit of the invention.

What is claimed is:

1. A process for removing contaminants from soils, the process comprising the steps of:
   reacting a hydrocarbon containing stream, a fuel stream, and an oxygen stream in a combustion chamber under conditions producing a reaction product stream comprising carbon dioxide and water vapor;
   separating out carbon dioxide from the reaction product stream into a carbon dioxide stream;
   contacting a soil stream having hydrocarbon contaminants with the carbon dioxide stream to extract hydrocarbon contaminants from the soil stream; and
   separating the carbon dioxide stream and a portion of the hydrocarbon contaminants from the soil stream.

2. The process of claim 1, wherein the hydrocarbon containing stream of the reacting step comprises soil with hydrocarbon contaminants.

3. The process of claim 1, wherein the oxygen stream of the reacting step comprises substantially pure oxygen.

4. The process of claim 1, wherein the reacting step further comprises introducing a water stream into the combustion chamber.

5. The process of claim 1, wherein after the reacting step, the process further comprises the step of:
   recycling a portion of the reaction product stream from the reacting step into the combustion chamber.

6. The process of claim 1, wherein after the second separating step, the process further comprises the step of:
   returning the carbon dioxide stream and the hydrocarbon contaminants to the combustion chamber.

7. The process of claim 1, wherein after the second separating step, the process further comprises the step of:
   recycling a portion of the carbon dioxide stream for contacting with the soil stream.

8. The process of claim 1, further comprising the steps of:
   recovering a portion of the heat energy generated in the reacting step;
   transferring the recovered heat energy to a second soil stream having volatile hydrocarbon contaminants to vaporize volatile hydrocarbon contaminants from the second soil stream; and
   separating the vaporized hydrocarbon contaminants from the second soil stream.

9. The process of claim 8, further comprising the step of:
   introducing the vaporized hydrocarbon contaminants into the combustion chamber for combustion.

10. The process of claim 8, wherein the transferring step comprises transferring the recovered heat energy to the second soil stream having volatile hydrocarbon contaminants using a screw conveyor in a partial vacuum environment to vaporize hydrocarbon contaminants from the second soil stream.

11. The process of claim 1, wherein after the second separating step, the process further comprises the steps of:
   washing the soil stream with an acidic stream;
   separating the soil stream from the acidic stream; and
   neutralizing the soil stream by blending with a basic compound.

12. The process of claim 11, further comprising the steps of:
   neutralizing the acidic stream to form a brine solution comprising water and a salt;
   separating a portion of the water from the brine solution; and
   introducing the separated portion of water into the combustion chamber during the reacting step.

13. A process for removing contaminants from soil, the process comprising the steps of:
   reacting a hydrocarbon containing stream, a fuel stream, and a substantially pure oxygen stream in a combustion chamber under conditions producing a reaction product stream comprising carbon dioxide and water vapor, wherein the hydrocarbon containing stream comprises soil with hydrocarbon contaminants;
   separating out carbon dioxide from the reaction product stream into a carbon dioxide stream;
   contacting a second soil stream having hydrocarbon contaminants with the carbon dioxide stream to extract hydrocarbon contaminants from the second soil stream;
   separating the carbon dioxide stream and a portion of the hydrocarbon contaminants from the second soil stream; and returning the carbon dioxide stream and the hydrocarbon contaminants to the combustion chamber.

14. The process of claim 13, wherein the reacting step further comprises introducing a water stream into the combustion chamber.

15. The process of claim 13, wherein the reacting step, the process further comprises the step of:

recycling a portion of the reaction product stream from the reacting step into the combustion chamber.

16. The process of claim 13, further comprising the steps of:

recovering a portion of the heat energy generated in the reacting step;

transferring the recovered heat energy to a third soil stream having volatile hydrocarbon contaminants to vaporize volatile hydrocarbon contaminants from the third soil stream; and separating the vaporized hydrocarbon contaminants from the third soil stream.

17. The process of claim 16, further comprising the step of:

introducing the vaporized hydrocarbon contaminants into the combustion chamber for combustion.

18. The process of claim 16, wherein the transferring step comprises transferring the recovered heat energy to the third soil stream having volatile hydrocarbon contaminants using a screw conveyor in a partial vacuum environment to vaporize hydrocarbon contaminants from the third soil stream.

19. The process of claim 13, wherein after the second separating step, the process further comprises the steps of:

washing the soil stream with an acidic stream;

separating the soil stream from the acidic stream; and neutralizing the soil stream by blending with a basic compound.

20. The process of claim 19, further comprising the steps of:

neutralizing the acidic stream to form a brine solution comprising water and a salt;

separating portion of the water from the brine solution; and introducing the separated portion of water into the combustion chamber during the reacting step.

* * * * *